(12) United States Patent  
Otschik et al.

(10) Patent No.: US 11,892,082 B2  
(45) Date of Patent: Feb. 6, 2024

(54) MECHANICAL SEAL ARRANGEMENT HAVING AN IMPROVED SECONDARY SEAL

(71) Applicant: EagleBurgmann Germany Gmbh & Co. KG, Wolfratshausen (DE)

(72) Inventors: Joachim Otschik, Murnau (DE); Petia Philippi, Wolfratshausen (DE); Felix Meier, Taufkirchen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 47 days.

(21) Appl. No.: 17/793,444

(22) PCT Filed: Nov. 24, 2020

(86) PCT No.: PCT/EP2020/083145  
§ 371 (c)(1),  
(2) Date: Jul. 18, 2022

(87) PCT Pub. No.: WO2021/151539  
PCT Pub. Date: Aug. 5, 2021

(65) Prior Publication Data  
US 2023/0042625 A1 Feb. 9, 2023

(30) Foreign Application Priority Data

Jan. 27, 2020 (DE) ..................... 10 2020 200 914.7

(51) Int. Cl.  
*F16J 15/34* (2006.01)

(52) U.S. Cl.  
CPC ......... *F16J 15/344* (2013.01); *F16J 15/3452* (2013.01)

(58) Field of Classification Search  
CPC .......... F16J 15/00; F16J 15/34; F16J 15/3436; F16J 15/344; F16J 15/3448; F16J 15/3452; F16J 15/3464; F16J 2015/0856

(Continued)

(56) References Cited

U.S. PATENT DOCUMENTS

2018/0238452 A1 * 8/2018 Shaw ..................... F16J 15/164

FOREIGN PATENT DOCUMENTS

DE 202007012050 U1 10/2007  
DE 102012022465 A1 5/2014

(Continued)

OTHER PUBLICATIONS

International Search Report issued in PCT/EP2020/083145, dated Feb. 10, 2021.

*Primary Examiner* — Nathan Cumar  
(74) *Attorney, Agent, or Firm* — Locke Lord LLP; Scott D. Wofsy

(57) ABSTRACT

The invention relates to a mechanical seal arrangement comprising a mechanical seal (2) having a rotating seal ring (21) and a stationary seal ring (22) defining a seal gap (23) therebetween, a secondary seal (3) arranged on a back surface of one of the seal rings facing away from a sealing surface of the seal ring, the secondary seal (3) being made of a base material and having a coating (7) such that a material bond is formed between the coating (7) and the base material of the secondary seal, the secondary seal (3) being made of a base material and having a coating (7) such that a substance-to-substance connection is formed between the coating (7) and the base material of the secondary seal, a sleeve-shaped member (4) arranged radially inside the secondary seal (3), wherein a gap (5) having a gap height (H) is present between the sleeve-shaped component (4) and a region of one of the sliding rings facing radially inwards, the secondary seal (3) seals against the back side of this slide ring and the sleeve-shaped component (4), wherein the coating (7) is provided on a first side (31) of the secondary seal (3), which first side facing the sliding ring, and a second side (32) of the secondary seal (3) which second side facing the sleeve-shaped component (4), wherein a stiffness of the coating (7) is greater than a stiffness of the base material of (Continued)

Figure 1:
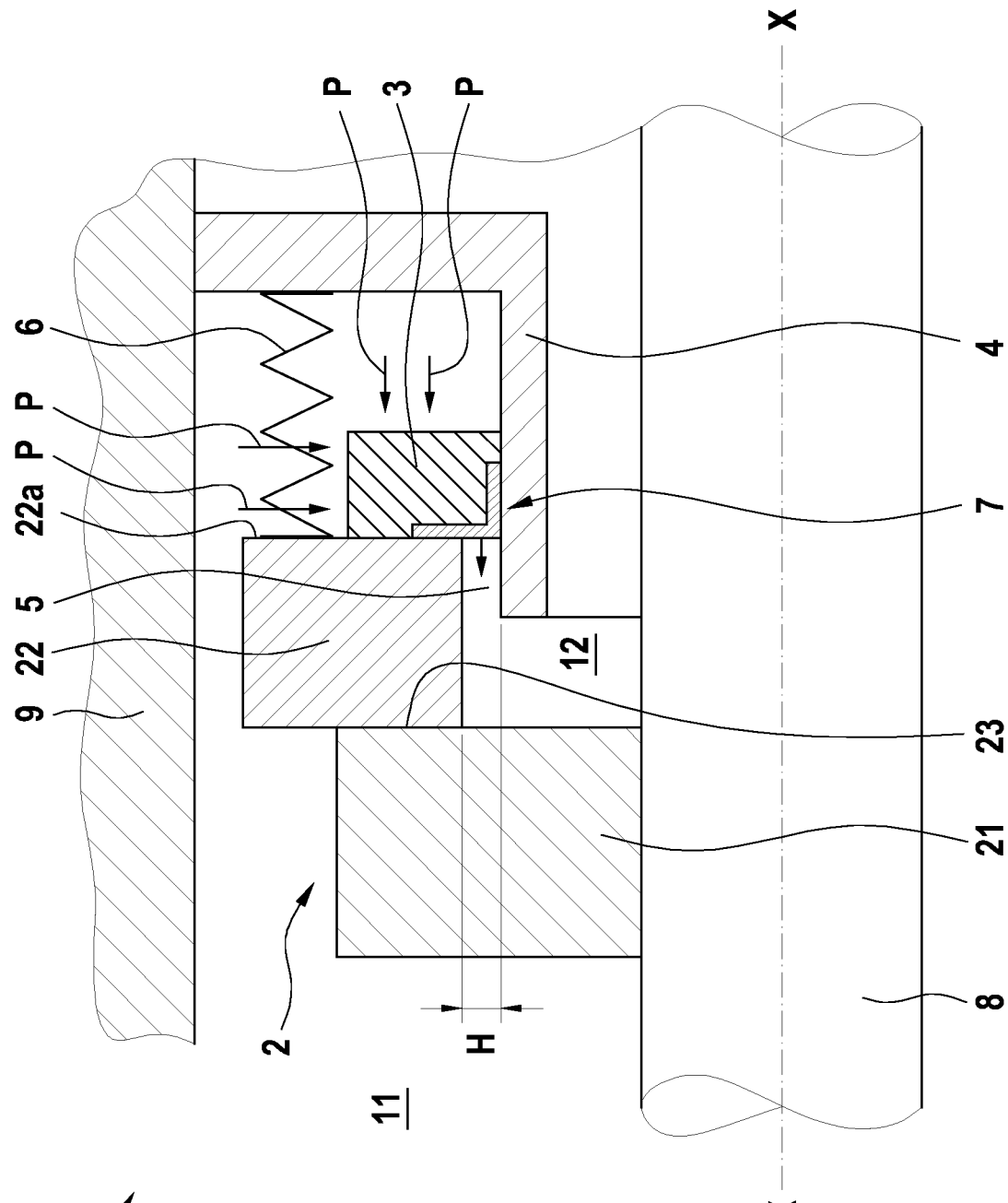

the secondary seal (3) and wherein a thickness (D) of the coating is smaller than or equal to a gap height (H) of the gap (5).

12 Claims, 5 Drawing Sheets

(58) Field of Classification Search
USPC .......................................................... 277/358
See application file for complete search history.

(56) References Cited

FOREIGN PATENT DOCUMENTS

| | | | | |
|---|---|---|---|---|
| DE | 102017214132 A1 | * | 2/2019 | ........... F16J 15/3268 |
| EP | 3594307 A1 | | 1/2020 | |
| WO | WO-2009030298 A1 | * | 3/2009 | ............. F16J 15/166 |
| WO | WO-2010020364 A1 | * | 2/2010 | ............... F16J 15/38 |
| WO | 2019002762 A1 | | 1/2019 | |

* cited by examiner

MECHANICAL SEAL ARRANGEMENT HAVING AN IMPROVED SECONDARY SEAL

CROSS-REFERENCE TO RELATED APPLICATIONS

This application is a U.S. National Phase Application filed under 35 U.S.C. § 371, based on International Patent Application No. PCT/EP2020/083145, filed Nov. 24, 2020, which claims priority to German Patent Application No. 10 2020 200 914.7, filed on Jan. 27, 2020, which are incorporated herein by reference.

The present invention relates to a mechanical seal arrangement having an improved secondary seal.

Mechanical seals in various designs which include secondary seals are known from prior art. Such secondary seals, for example, sealing on a back side of a slide ring suffer from the fact that the secondary seals are exposed to high pressures and/or high temperatures. Moreover, secondary seals are required to be minimally axially movable so as to be able to compensate for axial displacements, for example of a shaft or the like which is to be sealed, or for movements occurring when starting up and braking a machine. In addition, the secondary seal is to perform a sealing function when the machine is at a standstill. Due to the pressure differences between the medium to be sealed and the atmosphere, which can be in the range of several 105 Pa, the secondary seal is at risk to be partially drawn into a gap on the slide ring where it is supposed to seal, so that a so-called extrusion plume may be formed on the sliding ring, i.e. material from the secondary seal is drawn into the gap. This extrusion plume in the gap on the slide ring can cause malfunctions during operation, even resulting in possible total failure of the secondary seal. However, this must absolutely be avoided.

To avoid such extrusions of secondary seals, a mechanical seal arrangement comprising a secondary seal, which provides an additional ring element made of a material which is different at the gap is known, for example, from DE10 2012 022 465 A1. Although this basically may reduce the occurrence of secondary seal extrusion into in the gap, it is required to provide a ring for the secondary seal which is specifically designed depending on application.

It is therefore the object of the present invention to provide a mechanical seal arrangement which, while having simple design and simple low-cost manufacturability, comprises an improved secondary seal which especially also provides reliable sealing actions when sealing media which are exposed to very high pressure. This object will be solved by providing a mechanical seal arrangement having the features of claim 1. The subclaims will set forth preferred further embodiments of the invention.

Contrary to the foregoing, the mechanical seal arrangement according to the invention having the features of claim 1 has the advantage that the secondary seal comprises a coating thereby reducing any extrusion tendency of the secondary seal in a gap against which the secondary seal seals. According to the invention, this will be achieved by providing the secondary seal having a coating which is bonded to a base material of the secondary seal via substance-to-substance bonding. The coating is provided on two sides of the secondary seal, i. e. on a first side facing toward one of the sliding rings and on a second side facing toward a sleeve-shaped component on which the gap to the slide ring is present with a predetermined gap height. Herein, a stiffness of the coating of the secondary seal is greater than a stiffness of the base material. Furthermore, a maximum thickness of the coating is less than or equal to the gap height of the gap, especially less than or equal to half of the gap height. If any material of the secondary seal now extrudes into the seal gap when operating the mechanical seal, regions of the first and second sides, especially where the coating is present, will be extruded into the gap due to the coating of the secondary seal. This will result in overlapping of the coated side regions of the secondary seal in the gap, as material from both the first side and the second side, each having the coating, extrudes into the gap. The first and second sides of the secondary seal having the coating formed thereon are adjacent to each other, such that a transition zone between the first and second sides of the secondary seal especially will be provided with the coating. However, as a stiffness of the coating is greater than a stiffness of the base material of the secondary seal, large tensile and/or shear stresses result in the region of the coating which has not yet been extruded into the gap, so that further extrusion of the secondary seal into the gap will be prevented. Thus, proficient arrangement of the stiffer coating on the secondary seal can prevent material from the secondary seal from extruding too deeply into the gap. In this regard, the solution according to the invention appears to be surprisingly simple even to a person skilled in the art, since providing a stiffness to the coating higher than that of base material of the secondary seal, some small extrusion into the gap is allowed, but this will be subsequently be stopped by proficiently selecting the coating, and further extrusion will be prevented.

Preferably, the thickness of the coating is exactly half of the gap height. This still allows the coating to be applied to the secondary seal at a very low cost and, if during operation any situation occurs extruding the secondary seal into the gap, material from the secondary seal will then be extruded into the gap which is exclusively from the coating, due to the thickness of the coating corresponding to half of the gap height. Thus, one half of the gap is filled with the coating on the first side of the secondary seal and the other half of the gap is filled with the coating on the second side of the secondary seal.

Further preferably, a thickness of the coating is at least as thick as a ⅒ of the gap height, more preferably at least a ⅕ of the gap height, even more preferably ¼ of the gap height. The coating preferably has a thickness in a range from 20 µm to 50 µm.

In particular, good durability and high sealing performance will be achieved if the coating is provided only partially on the first side and/or on the second side of the secondary seal. In other words, the secondary seal is in contact with the surfaces of the mechanical seal to be sealed both with the coating and with an uncoated area of base material. The uncoated regions are made of the base material of the secondary seal, thus enabling reliable sealing at their contact surfaces. Thus, sealing action is performed by the uncoated regions of the secondary seal and the coating can be designed so as extrusion into the gap will be minimized.

A size of the coating surface on the secondary seal on the first and second sides is preferably the same. Particularly preferably, a width C of the coating, starting from the inner edge of the secondary seal, on the first and second sides of the secondary seal is in a range of four to ten times the gap height of the gap, especially five to six times the gap height.

Alternatively, the first and second sides of the secondary seal are provided completely covered with a coating. This has advantages, especially in terms of producing the coating at minimum cost, since the entire first and second sides of the secondary seal may then be coated in a simple manner.

If the coating is applied only partially, it is required to work using a mask or to mask off areas on the secondary seal, which will slightly increase the manufacturing effort.

A value of a stiffness of the coating in a range of two to twelve times a stiffness of the base material of the secondary seal is particularly preferred. Especially, the stiffness of the coating is at least five times the stiffness of the base material.

The coating preferably includes plastic material, especially a thermoplastic material and further preferably a single-grade plastic or a plastic material including filler material. The filler material is preferably carbon graphite. For example, polyetherketone (PEK) can be used as the plastic material, especially polyaryletherketone (PAEK) or polyetheretherketone (PEEK) or polyamideimide (PAI) or polyimide (PI) or any mixture thereof. The plastic materials may also contain small amounts of fillers, e.g. carbon or PTFG.

The base material of the secondary seal is preferably polytetrafluoroethylene (PTFE) or an elastomer or polytetrafluoroethylene with filler, especially with carbon graphite.

Preferably, the secondary seal seals directly against a sealing surface of the mechanical seal, especially against the stationary sealing surface. Further preferably, the secondary seal seals directly against the sleeve-shaped component. Alternatively, an intermediate component is provided between the slide ring and the sleeve-shaped component.

Particularly preferably, the secondary seal seals against a pressure side of the mechanical seal, so that the secondary seal is exposed to the pressure to be sealed.

Figure 2:
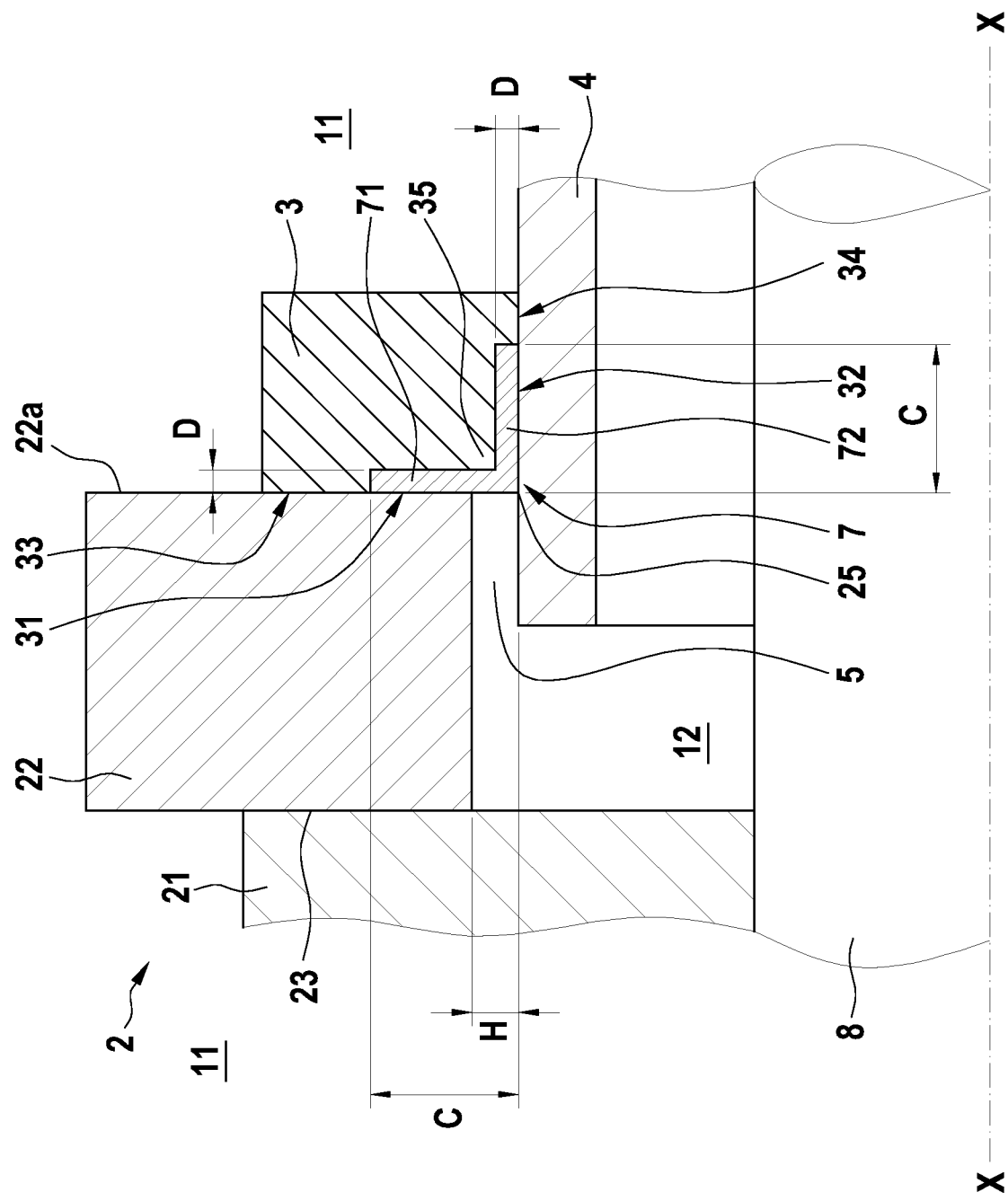
Figure 3:
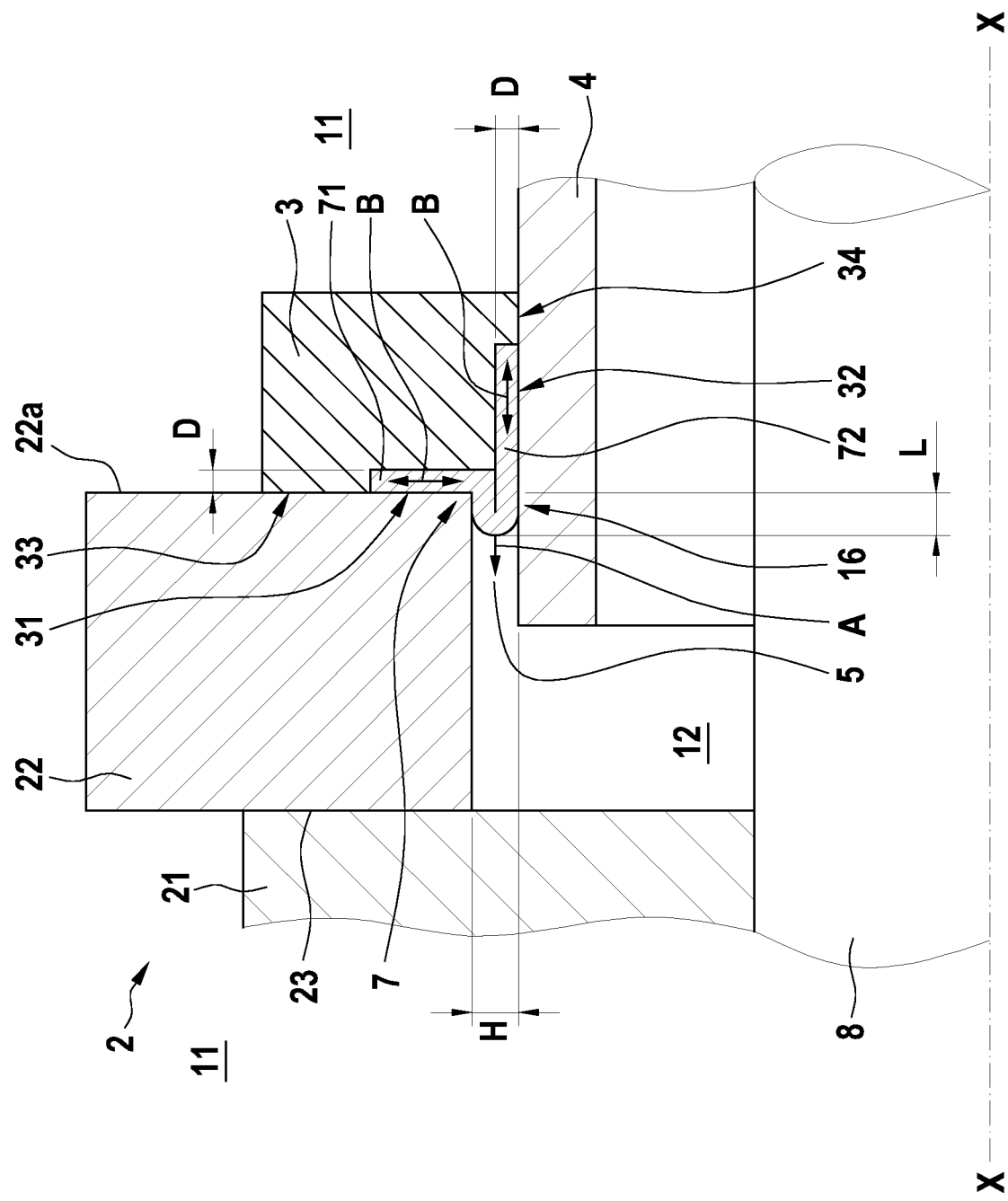
Figure 4:
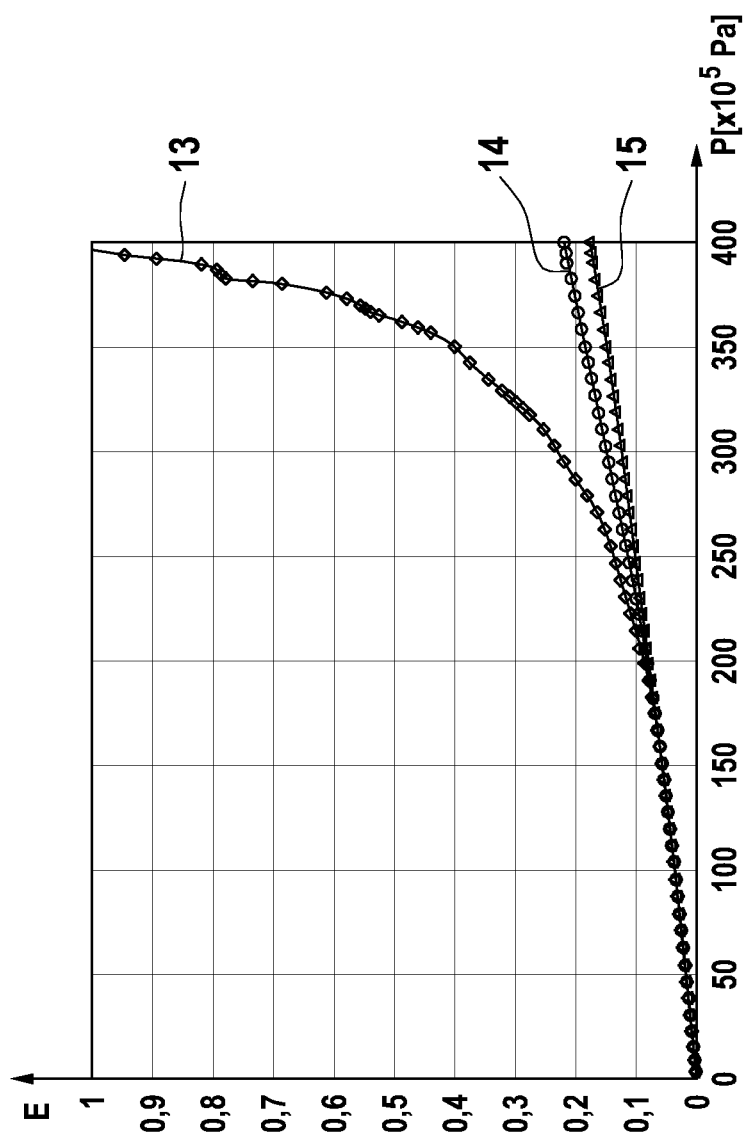
Figure 5:
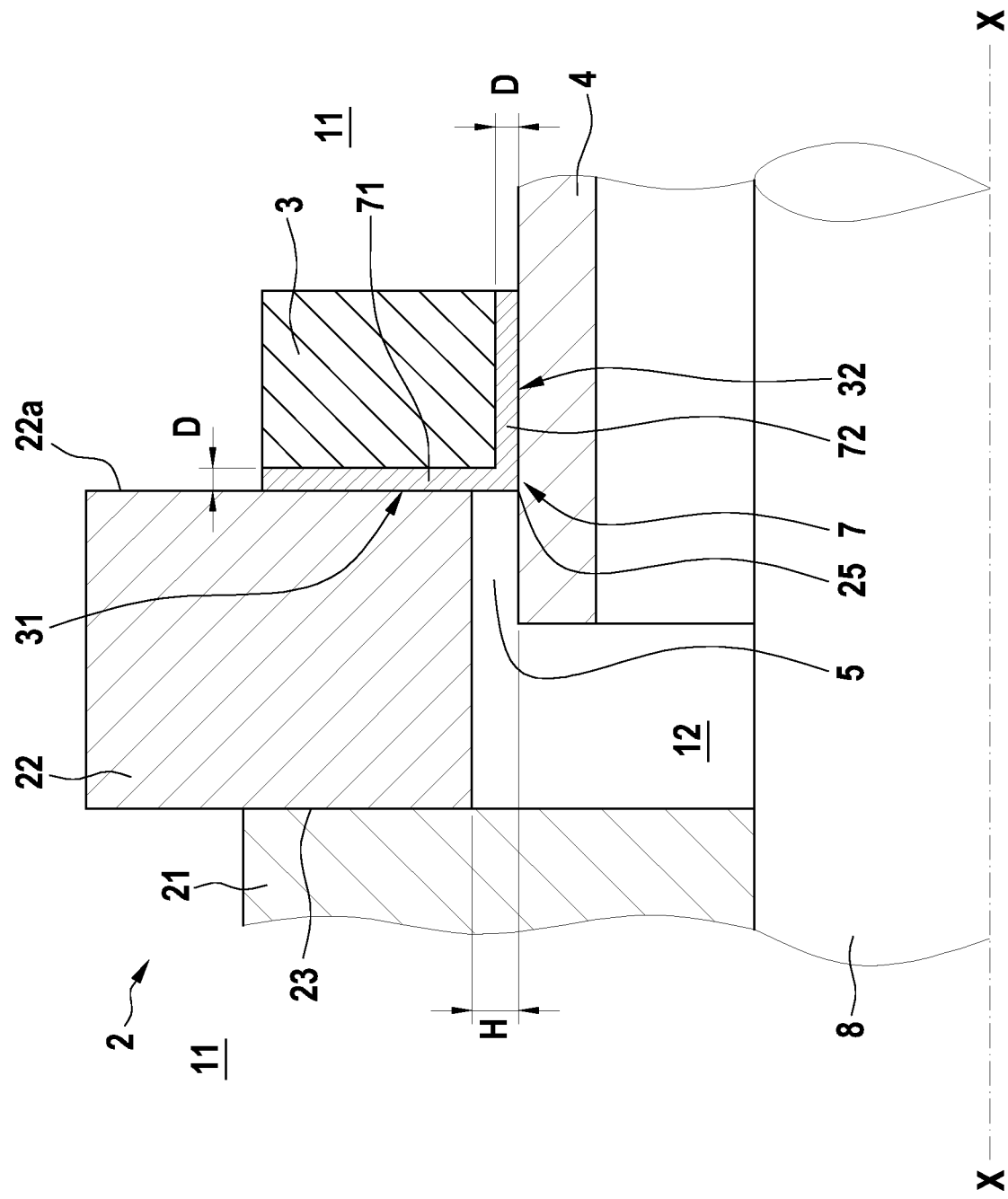

Preferred embodiments of the invention will be described in detail below while reference will be made to the accompanying drawing, wherein:

FIG. 1 is a schematic view of a mechanical seal arrangement according to a first embodiment of the invention with a secondary seal being in a non-extruded state, FIG. 2 is an enlarged schematic view of the secondary seal of FIG. 1, FIG. 3 is a schematic view of the mechanical seal arrangement of FIG. 1 with a secondary seal being in an extruded state, FIG. 4 is a diagram showing the extrusion E of the secondary seal of FIGS. 2 and 3 as a function of a pressure P for different layer thicknesses in comparison with an uncoated secondary seal, and FIG. 5 is a schematic representation of a mechanical seal arrangement having a secondary seal according to a second embodiment of the invention.

In the following, a mechanical seal arrangement 1 according to a first preferred embodiment of the invention will be described in detail while making reference to the FIGS. 1 to 4.

As may be seen from FIG. 1, the mechanical seal arrangement 1 comprises a mechanical seal 2 having a rotating slide ring 21 and a stationary slide ring 22 defining a sealing gap 23 therebetween.

The mechanical seal 2 seals off a product region 11 from an atmospheric region 12. The product region 11 is under high pressure.

The sealing action is performed at a shaft 8, the rotating slide ring 21 being connected to the shaft 8.

The mechanical seal 2 further comprises a biasing element 6, which, in this embodiment, biases the stationary slide ring 22 against the rotating slide ring 21. Reference number 9 denotes a stationary housing of the mechanical seal arrangement.

Furthermore, a sleeve-shaped component 4 is provided which is stationary and through which the shaft 8 is passed.

Herein, the sleeve-shaped component 4 is arranged partly radially inside a secondary seal 3 and radially inside the stationary mechanical slide ring 22. This results in a gap 5 between the sleeve-shaped component 4 and the stationary slide ring 22.

As may be seen from FIG. 1, the mechanical seal arrangement 1 is designed such that the product region 11 also extends to a back side 22a of the stationary slide ring 22. As a result, the secondary seal 3 is also exposed to the pressure in the product region 11, which is indicated by the arrows P in FIG. 1.

The secondary seal 3 has a coating 7, which may be seen in detail in FIG. 2. The coating 7 is formed on a first side 31 of the secondary seal as a first coating region 71 and on a second side 32 of the secondary seal as a second coating region 72. In this case, the first side 31 and the second side 32 are not completely coated, but an uncoated area 33 is still provided on the first side and an uncoated area 34 is provided on the second side. The coating 7 is thereby formed at a transition zone 25 between the first side 31 and the second side 32. In this embodiment, the transition zone 25 is an edge of the secondary seal 3 (cf. FIG. 2). Herein, a width C of the coating is the same on the first side 31 and the second side 32.

A thickness D of the coating is constant on both the first and second sides. FIG. 2 shows the secondary seal 3 being in the non-extruded state, in which the secondary seal 3 is not extruded into the gap 5. FIG. 3, on the other hand, shows the extruded state, which may occur during operation, especially due to the high pressure difference between the product region 11 and the atmosphere region 12.

As may be seen from FIG. 3, the secondary seal 3 is extruded into the gap 5. However, this results in only a very short extrusion plume 16 in the axial direction X-X of the mechanical seal arrangement, since, as it is shown in FIG. 3, only coated areas of the secondary seal 3 will be extruded into the gap 5 (arrow A).

Since in this embodiment example a thickness D of the coating corresponds to half of the gap height H of the gap 5, only coating regions 71, 72 from the first side 31 and the second side 32 of the secondary seal 3 are thus extruded into the gap 5 (cf. FIG. 3).

A stiffness of the coating 7 is greater than a stiffness of the base material of the secondary seal 3. The coating is preferably a polyetherketone, especially PEEK, and the base material of the secondary seal is polytetrafluoroethylene.

Due to the higher stiffness of the coating 7 compared to the base material of the secondary seal 3, limitation of a length L of the extrusion plume 16 results in tensile and/or shear stresses in the stiffer coating 7 occurring both on the first side 31 and the second side 32, thus counteracting any further extrusion of the secondary seal 3 into the gap 5. The tensile and/or shear stresses are indicated by the double arrow B in FIG. 3. These tensile stresses B in the coating areas 71, 72 prevent the secondary seal 3 from being extruded further into the gap 5.

Since the coating 7 is not provided entirely on the first side 31 and the second side 32 of the secondary seal 3, the base material of the secondary seal 3 is thus in direct contact with the back side 22a of the stationary slide ring 22 at the uncoated region 33 and with the sleeve-shaped component 4 at the uncoated region 34. As a result, secure sealing may be achieved in those regions 33, 34, so that the sealing properties of the secondary seal 3 are not significantly affected by the coating 7.

FIG. 4 shows a diagram of a comparison of an extrusion E (dimensionless) of various secondary seals into the gap 5 above the pressure P in Pa in the product region 11 at ambient temperature (20° C.). Herein, the curve identified by the reference number 13 is a secondary seal without coating. In the curve identified by the reference number 14, a coating 7 having a thickness D of 25 µm is provided. In the curve identified by the reference number 15, a coating of 50 µm is provided. A gap height H is 100 µm in all tests and a stiffness of the coating is greater than that of the base material by a factor of 5 in each case.

As may be seen from the diagram of FIG. 4, up to a range of about 200×105 Pa, the extrusion E is approximately the same for all curves 13, 14, 15. At a pressure higher than 200×10$^5$ Pa, the extrusion tendency of the secondary seal without coating becomes significantly higher. In this case, without any coating being at a pressure of approximately 400×10$^5$ Pa, an extrusion plume 16 results in the range of E=1 approximately. In contrast, for curve 14 showing a coating having a thickness of 25 µm, the extrusion plume in the range of 400×10$^5$ Pa is significantly smaller by a factor of five, with E=0.2 appx. Further reduction of the extrusion plume to E=0.15 appx. may be achieved using a coating thickness of 50 µm for the coating 7.

However, as may be seen from the diagram of FIG. 4, the difference between the length of the extrusion plumes at a pressure of 400×10$^5$ Pa between the coating of 25 µm and the coating of 50 µm is only in the range of about 10 µm. It thus may be concluded that a coating thicker than 50 µm would not create extrusion plumes into gap 5 which are significantly different.

The best results in extrusion preventing will be achieved when the layer thickness D is half of the gap height H of the gap 5. As it is shown in FIG. 3, an extrusion performance will then be obtained wherein only a very small extrusion plume 16 is drawn into the gap 5 and the tensile and/or shear stresses B in the coating 7 will subsequently prevent any further extrusion.

FIG. 5 shows a mechanical seal arrangement 1 according to a second embodiment of the invention, wherein equal or functionally equal parts are identified using the same reference numbers.

In contrast to the first example embodiment, in the second example embodiment, the coating 7 is provided such that both the first side 31 and the second side 32 of the secondary seal are completely covered with the coating 7. In particular, this allows to provide a coating that is very easy to apply, since no regions on the secondary seal 3 are required to be covered or taped to prevent a coating 7 to be coated onto all regions of the first and second sides. In turn, a thickness D of the coating 7 is selected such that the thickness D corresponds to half of the gap height H. Otherwise, this example embodiment corresponds to the previous embodiment example, so that reference can be made to the description given therein.

LIST OF REFERENCE NUMBERS

1 Mechanical seal arrangement
2 Mechanical seal
3 Secondary seal
4 Sleeve-type component
5 Gap
6 Biasing member
7 Coating
8 Shaft
9 Housing
11 Product region
12 Atmosphere region
13 Secondary seal without coating (prior art)
14 Secondary seal with coating of 25 µm
15 Secondary seal with coating of 50 µm
16 Extrusion plume
21 Rotating slide ring
22 Stationary slide ring
22a back side of the stationary slide ring
23 Sealing gap
25 Transition zone
31 First side of the secondary seal
32 Second side of the secondary seal
33 Uncoated region on the first side of the secondary seal
34 Uncoated region on the second side of the secondary seal
71 Coating region on the first side
72 Coating region on the second side
A Extrusion direction
B Tensile stress in the coating
C Width
D Thickness of the coating
E Extrusion
H Gap height
L Length of the extrusion plume
P Pressure exerted on secondary seal
X-X Axial direction

The invention claimed is:

1. A mechanical seal arrangement comprising:
   a mechanical seal having a rotating slide ring and a stationary slide ring defining a seal gap therebetween,
   a secondary seal arranged on a back side of one of the slide rings facing away from a sliding surface of the slide ring,
   the secondary seal being made of a base material and having a coating such that a substance-to-substance bond is formed between the coating and the base material of the secondary seal,
   a sleeve-shaped component which is arranged radially inside the secondary seal, a gap having a gap height being present between the sleeve-shaped component and a region of one of the slide rings facing radially inwards, the secondary seal sealing against the back side of this slide ring and the sleeve-shaped component,
   wherein the coating is provided on a first side of the secondary seal facing the slide ring and a second side of the secondary seal facing the sleeve-shaped component,
   wherein a stiffness of the coating is greater than a stiffness of the base material of the secondary seal, and
   wherein a thickness of the coating is smaller than or equal to a gap height of the gap.

2. The mechanical seal arrangement according to claim 1, wherein the coating is smaller than or equal to half of the gap height (H) of the gap.

3. The mechanical seal arrangement according to claim 1, wherein the thickness of the coating is at least 1/10 of the gap height of the gap, especially at least 1/5 of the gap height of the gap, further especially at least 1/4 of the gap height.

4. The mechanical seal arrangement according claim 1, wherein a width of the coating on the secondary seal is four to ten times the gap height.

5. The mechanical seal arrangement according to claim 1, wherein the coating on the first side of the secondary seal is provided only partially, or wherein the coating on the first side of the secondary seal is provided completely.

6. The mechanical seal arrangement according claim 1, wherein the coating on the second side of the secondary seal is provided only partially, or wherein the coating on the second side of the secondary seal is provided completely.

7. The mechanical seal arrangement according claim 1, wherein a value of a stiffness of the coating is in a range of two times to twelve times a value of a stiffness of the base material of the secondary seal, especially five times.

8. The mechanical seal arrangement according claim 1, wherein the coating comprises a plastic material, especially a single-grade plastic material or a plastic material including filler material.

9. The mechanical seal arrangement according to claim 8, wherein the coating comprises polyetherketone or polyaryletherketone or polyetheretherketone or polyamideimide or polyimide or any mixture thereof.

10. The mechanical seal arrangement according to one of the preceding claim 1, wherein the base material of the secondary seal is polytetrafluoroethylene or is polytetrafluoroethylene including filler or is an elastomer.

11. The mechanical seal arrangement according to claim 1, wherein the secondary seal is in direct contact with the slide ring or is in contact with a component which is directly or indirectly connected to the slide ring.

12. The mechanical seal arrangement according to one of the preceding claim 1, wherein the secondary seal is in contact with the stationary slide ring.

* * * * *